… … …

United States Patent Office 3,366,446
Patented Jan. 30, 1968

3,366,446
PROCESS FOR DECOMPOSITION OF ALUMINUM NITRATE NONAHYDRATE
Donald H. Kelly, Gladstone, and Anthony W. Yodis, Whippany, N.J., assignors to Allied Chemical Corporation, New York, N.Y., a corporation of New York
No Drawing. Filed July 16, 1965, Ser. No. 472,680
4 Claims. (Cl. 23—143)

This invention relates to a process for the decomposition of aluminum nitrate nonahydrate for the production of nitric acid and cell grade alumina.

It is known to produce aluminum nitrate by the digestion of aluminous ores with aqueous nitric acid, followed by crystallization of aluminum nitrate as the nonahydrate $Al(NO_3)_3 \cdot 9H_2O$, and decomposition of the aluminum nitrate nonahydrate to alumina and nitric acid by the application of heat at atmospheric pressure. In the production of cell grade alumina, this is, alumina of the high purity required for reduction to aluminum metal in electrolytic cells, such aluminum nitrate nonahydrate may be produced in substantially iron-free state, to yield alumina containing less than about 0.05% by weight of iron as $Fe_2O_3$ based on the $Al_2O_3$ content or a weight ratio of $Al_2O_3$ to $Fe_2O_3$ of at least about 2,000.

Denitrification of aluminum nitrate nonahydrate has been carried out in the past by direct application of heat at atmospheric pressure to the aluminum nitrate nonahydrate crystals which melt at 73.5° C. and boil at 135° C. with decomposition. In such prior art process it is possible, with rapid agitation of the melt, to remove 50% of the nitrogen pentoxide ($N_2O_5$) and water from the crystals and recover them as nitric acid ($HNO_3$) of 50% concentration. The remaining melt then has a boiling point of about 148° C. While the viscosity of the initial aluminum nitrate nonahydrate melt is only about 100 centipoises, this viscosity increases markedly as denitrification proceeds at atmospheric pressure and by the time 50% of the nitric acid has been removed, it has risen to 10,000 centipoises or higher. At these higher viscosities not only is adequate agitation difficult, but there is a tendency for the melt to cling to the walls of the decomposition vessel resulting in local overheating and rapid solid build-up on the walls which complicates further denitrification. When the melt is cooled, it is sticky and gummy with a softening point of about 123° C. Attempts to denitrify the product below its softening point have been unsuccessful, since several hours are required to remove as little as 1% of the remaining nitric acid values at 110° C.

Procedures which have been used in the past in attempts to overcome the above difficulties have generally followed one of two directions. In one procedure the molten aluminum nitrate nonahydrate is sprayed onto a hot bed of alumina in a rotary kiln. In this procedure, heat must be supplied indirectly to the bed, otherwise the inert materials such as combustion gases, will interfere with recovering nitric acid values. As a result, heat requirements are high because of low heat transfer efficiency in the bed, and caking and balling in the bed are commonly encountered.

In another type of prior art procedure, molten aluminum nitrate nonahydrate is sprayed onto a fluidized bed of alumina heated as by bayonet heaters. This requires extremely close control of spraying and fluidizing gas feed to prevent caking of the bed. Moreover, if steam is used as fluidizing medium, a dilute nitric acid is recovered. If an inert gas is used, this poses the difficult recovery of nitric acid values from a dilute gas stream.

It is an object of the present invention to provide a process for decomposing aluminum nitrate nonahydrate which effects substantially complete recovery of both alumina and nitric acid values, while avoiding the difficulties of the prior art denitrification processes.

Another object of the invention is to provide an aluminum nitrate nonahydrate denitrification process wherein no highly viscous liquid stage is encountered.

A further object of the invention is to provide a process for decomposing aluminum nitrate nonahydrate wherein there are produced in succession as intermediate products (1) a low viscosity, pumpable melt, and (2) a crushable, non-meltable powder suitable for calcining.

Other objects will be apparent from the description that follows.

The above and other objects are accomplished according to our invention wherein aluminum nitrate nonahydrate of a high degree of purity is melted, and heated to a temperature above its decomposition temperature under a superatmospheric pressure sufficient to maintain said decomposition temperature (but not in excess of about 230° C.) while removing decomposition products until between about 45% and about 60% of the $HNO_3$ of the aluminum nitrate nonahydrate has been removed, and the melt remains in a non-viscous, liquid state; reducing said superatmospheric pressure to at least as low as atmospheric pressure (760 mm. Hg) whereby additional nitric acid values are released and a friable solid residue is produced; thereafter subjecting the solidified melt under atmospheric pressure to a temperature between about 120° C. and the melting point of the solidified melt for a period of at least about ½ hour whereby a non-melting friable solid is obtained. The resulting solid can be readily broken into chunks or crushed to any desired size although it still contains a substantial amount of nitric acid and water, having an approximate composition of $Al_2O_3 \cdot N_2O_5 \cdot 5H_2O$, it is a valuable commercial intermediate for use in the production of cell grade alumina by further decomposition and calcining, and can be stored or shipped in this form for future use. When the non-melting solid is to be further decomposed, this may be accomplished by subjecting the non-melting solid to a temperature above its decomposition temperature for a period sufficient to substantially complete the decomposition of the remaining aluminum nitrate leaving substantially pure $Al_2O_3$ and thereafter calcining the alumina at temperatures of at least about 1100° C. to alpha alumina.

The process of decomposing aluminum nitrate nonahydrate according to our invention is carried out in a number of separate successive stages, each stage of which effects a transformation of the aluminum nitrate nonahydrate to a different intermediate product, each of which is readily handled for conversion to the succeeding intermediate. After each stage, the nitric acid values released are condensed and recovered as high strength (50–60%) nitric acid.

In carrying out the process of our invention, we first melt the aluminum nitrate nonahydrate by heating it to a temperature slightly above its 73.5° C. melting point, for example, to about 770 C. The aluminum nitrate nonahydrate may be considered not only as having the Formula I, $Al(NO_3)_3 \cdot 9H_2O$, but also as having the identical constituents and proportions stated as II, $$Al_2O_3 \cdot 3N_2O_5 \cdot 18H_2O$$

or as III, $Al_2O_3 \cdot 6HNO_3 \cdot 15H_2O$. The melt thus produced is solution of aluminum nitrate in its water of crystallization and is a non-viscous liquid having a viscosity of about 100 centipoises. It is then transferred, as by pumping the melted aluminum nitrate nonahydrate to an autoclave, and the autoclave is closed. The autoclave is heated to above the decomposition temperature of the aluminum nitrite nonahydrate, suitably to about 150° C. or higher and the pressure is allowed to build up to the point necessary to prevent boiling of the melt, for example 25 p.s.i.g. to 80 p.s.i.g. At these pressures the boiling point of the aluminum nitrate nonahydrate is about 170° C to 230° C. in comparison to a 135° C. boiling point at atmospheric pressure. Pressure is maintained between about 25 p.s.i.g. and about 80 p.s.i.g. with temperatures between about 170° C. and about 230° C. while agitating the melt and while bleeding off gaseous decomposition products as nitric acid and water vapor, to a condenser wherein they are recovered as 55%–60% nitric acid. Use of the elevated temperature and pressures of our invention produces a higher strength nitric acid than the approximately 53% maximum concentration produced at atmospheric pressures.

The indicated pressure and temperature conditions are maintained until between about 45% and about 60%, usually about 50%, of the nitric acid originally in the aluminum nitrate nonahydrate has been removed. The melt at this stage is still fluid, having a viscosity at 190° C. of less than about 1,000 centipoises usually about 600–700 centipoises and is easily agitated and pumped.

The 50% denitrified melt is then removed from the autoclave and passed to another vessel wherein the pressure is reduced to at least as low as atmospheric, thus "flashing" off a few additional percent, e.g., 1–3% additional $HNO_3$ from the melt, together with water vapor, These vapors are similarly collected in the same or supplementary condenser and are recovered, usually as about 60% $HNIO_3$.

The remaining melt after flashing, has a softening point considerably higher than that of the undecomposed aluminum nitrate nonahydrate, usually between about 150° C. and about 180° C., and upon cooling below this point becomes a friable solid.

The melt, after flashing, is cooled and is held at a temperature below its softening point and above the boiling point of the nitric acid/water azeotrope, i.e., about about 120° C., preferably at about 130° C., for a period of at least about ½ hour, preferably between about ½ hour and about 2 hours. Additional decomposition takes place during this heating or "drying" stage, and the decomposition products, $HNO_3$ and $H_2O$ ore condensed and recovered as high strength nitric acid, e.g., about 60%. In this step the $HNO_3$ taken off amounts to an additional 10% to 25% making a total of the original $HNO_3$ removed up to this stage, about 70%. This heating step is an extremely critical and important feature of our invention since, in some manner not clearly understood, it converts the thermoplastic, meltable material of the previous stage to a non-melting, friable solid that decomposes rapidly and substantially completely at 370° C. and higher, and more slowly at lower temperatures down to about 220° C. to yield substantially pure $Al_2O_3$ (95–99%) and avoids the handling difficulties inherent in the prior art viscous, sticky products.

The heated or "dried" material from the "drying stage" above is crushed if necessary or otherwise comminuted to any desired size suitable for calcining, for example, from one-inch chunks down to a fine powder.

The partially denitrified solid, which at this stage may have the empirical formula of approximately $$Al_2O_3 \cdot N_2O_5 \cdot 5H_2O$$

is then further heated, as in a "precalciner" to 330° C. to 400° C. until the solid is substantially completely decomposed to $Al_2O_3$, provision being made for removal and condensation of gaseous $HNO_3$ and $H_2O$ vapors, together with some nitric acid decomposition products, and their recovery as nitric acid.

The pressure at which the initial denitration step is carried out is critical and should be such that the initial boiling point of the melt is above about 150° C. and the temperature before flashing after the approximately 50% denitrification, is at least about 170° C. to obtain the advantages of high acid strength and low viscosity. Suitable pressures may range from about 25 p.s.i.g. to about 80 p.s.i.g. preferably between about 35 p.s.i.g. and about 50 p.s.i.g. No particular advantage appears to be gained in operating at pressures higher than 50 p.s.i.g. since the overall nitric acid strength recovered at 80 p.s.i.g. is essentially the same as at 50 p.s.i.g. and moreover, the recovered $HNO_3$ contains higher proportions of oxides of nitrogen dissolved in the nitric acid when 80 p.s.i.g. is used.

We prefer to carry out the initial pressure denitrification step to the point wherein apprxoimately 50% of the $HNO_3$ in the $Al(NO_3)_3 \cdot 9H_2O$ is driven off, although higher percentages of decomposition may be achieved, for example as high as 56% or higher, without producing melts of unduly high viscosities. However, when denitrification is carried out in this initial stage to the point of about 62% removal of nitric acid, solidification occurs in the autoclave, thus making further removal of $HNO_3$ difficult and uneconomic.

The process of our invention has the advantages that easily handled materials are produced in each stage of the process, and eventually produce a friable solid which lends itself readily to calcination to cell grade alumina. A strong nitric acid is produced directly from all stages; namely the pressure, flashing and "solid drying" and precalcining stages. Less heat is required overall in our process than for rotary kiln or fluid bed processes and only slightly more than for direct heating under atmospheric pressure.

The following specific examples further illustrate the invention. Parts are by weight except as otherwise noted.

EXAMPLE 1

A charge of 5750 grams of chemically pure $Al(NO_3)_3 \cdot 9H_2O$ containing not more than .002% of $Fe_2O_3$ and lesser amounts of other impurities was placed in a titanium autoclave equipped with an agitator. The temperature of the charge was raised to 77° C. to melt the charge, the agitator was inserted into the melt and the autoclave was closed. Temperature was then raised to maintain a pressure of between 48 p.s.i.g. and 52 p.s.i.g. for 4 hours while bleeding off gaseous decomposition products as $HNO_3$ and $H_2O$. Final temperature was 180° C. The vaporous by-products were collected in a condenser where they were recovered as 56% nitric acid.

At this stage 49.8% of the $HNO_3$ orginally in the charge had been removed and the melt had a viscosity of about 600 centipoises.

The fluid melt was then allowed to flash to a vessel where pressure was reduced to atmospheric, thus releasing an additional 2% of $HNO_3$ and water vapor.

The compositions of the original crystals and of the melt before and after "flashing" are shown in Table I below, based on a crystal formula viewed as $$Al_2O_3 \cdot 3N_2O_5 \cdot 18H_2O.$$

TABLE I

| | Percent by Weight | | |
| --- | --- | --- | --- |
| | Crystals $Al_2O_3 \cdot 3N_2O_5 \cdot 18H_2O$ | Melt Before Flashing | Melt After Flashing |
| $Al_2O_3$ | 13.6 | 24.7 | 26.0 |
| $N_2O_5$ | 43.2 | 39.4 | 39.9 |
| $H_2O$ | 43.2 | 35.9 | 34.1 |

The melt, after flashing, had a softening point of 152° C. and was a readily friable solid. It was broken up to a granular product suitable for calcining.

EXAMPLE 2

Fifty grams of the solid product obtained in Example 1 above was heated for 2 hours at 130° C. in an oven. The vaporous products were collected and condensed. They amounted to 13.5 grams of 60.3% $HNO_3$. The remaining melt was analyzed and found to have the composition shown in Table II below:

TABLE II

| | Percent by weight |
|---|---|
| $Al_2O_3$ | 35.5 |
| $N_2O_5$ | 35.4 |
| $H_2O$ | 29.1 |

Corresponding approximately to the empirical formula $$Al_2O_3 \cdot N_2O \cdot 5H_2O$$

The resulting heated product failed to exhibit a melting point. It decomposed rapidly at 300° C. and immediately at 375° C. leaving a residue with only insignificant amounts of $HNO_3+H_2O$. It decomposed more slowly at temperatures between about 220° C. and 300° C.

A portion of the non-melting solid obtained above was heated for 2 hours at 371° C. with removal and recovery of $HNO_3$ decomposition products. The remaining solid was analyzed and found to contain 94.5% $Al_2O_3$ thus indicating that 99.5% of the original $HNO_3$ and 98.5% of the $H_2O$ in the nonahydrate crystals had been removed from the product.

Another portion of the non-melting solid obtained above was heated for 2 hours at 316° C. with recovery of $HNO_3$ decomposition product. The remaining solid was found to contain 87.5% $Al_2O_3$ thus indicating that 98.5% of the original $HNO_3$ and 96% of the original $H_2O$ in the nonahydrate crystals had been removed from the product.

Other portions of the non-melting solid were heated for varying times at 260° C. and 371° C., respectively with recovery of $HNO_3$ and $H_2O$ decomposition products with the results shown in Tables III and IV below in terms of percent $HNO_3$ and $H_2O$ removed based on the total originally present in the $Al(NO_3)_3 \cdot 9H_2O$ crystals.

TABLE III

| | Percent $HNO_3$ and $H_2O$ Removed After Heating at 260° C. | | |
|---|---|---|---|
| | 1 hour | 2 hours | 4 hours |
| Percent $HNO_3$ Removed | 90.4 | 93.2 | 94.8 |
| Percent $H_2O$ Removed | 91.4 | 92.8 | 92.4 |

TABLE IV

| | Percent $HNO_3$ and $H_2O$ Removed After Heating at 371° C. | | |
|---|---|---|---|
| | 1 hour | 2 hours | 4 hours |
| Percent $HNO_3$ Removed | 98.2 | 99.2 | 99.2 |
| Percent $H_2O$ Removed | 96.0 | 97.2 | 97.9 |

EXAMPLE 3

A charge of 5500 grams of $Al(NO_3)_3 \cdot 9H_2O$ was placed in an autoclave and melted. The agitator was inserted into the melt and the autoclave was closed. The charge was then heated until pressure of 50 p.s.i.g. was reached and a temperature of 180° C. It was then maintained under agitation between 180° C. and 205° C. while bleeding off vaporous decomposition products to a condenser for 2 hours and 15 minutes, when 56.2% of the $HNO_3$ in the original charge had been removed. These vapors were condensed and recovered as 55.3% $HNO_3$. The remaining melt was then flashed to a vessel the pressure was reduced to atmospheric releasing additional vapors which were similarly condensed and recovered as $HNO_3$. The liquid product after flashing contained 28.6% $Al_2O_3$ and 38.5% $N_2O_5$ and had a softening point of 178° C. Upon heating the solids at 130° C. for 2 hours, additional vapors were removed and recovered as 57.7% $HNO_3$ making a total of 67.5% of the $N_2O_5$ recovered, and 2285 grams of a non-melting product was obtained which, although not as friable as the product obtained in Example 2 above, could be easily broken with the fingers and reduced to a powder after cooling.

EXAMPLE 4

A charge 5500 grams of $Al(NO_3)_3 \cdot 9H_2O$ was placed in an autoclave and melted. An agitator was inserted into the melt and the autoclave was closed. The temperature of the charge was then raised to 170° C. and was maintained between about 170° C. and about 185° C. at 35 p.s.i.g. pressure for 1½ hours when 48.2% of the $HNO_3$ had been removed as vaporous by-products. These vaporous by-products were collected in a condenser and recovered as 54.6% $HNO_3$. The resulting melt was passed to a receiver where pressure was released, causing "flashing" of additional $N_2O_5$ and $H_2O$ yielding an additional 2.6% of $N_2O_5$ as 58% $HNO_3$. The flashed product amounted to 2985 grams. It had a softening point of 147° C. with decomposition and contained 25.7% $Al_2O_3$ and 40.0% and $N_2O_5$. The solidified melt was then heated at 130° C. for 1 hour yielding additional vapors which were condensed as 60.4% $HNO_3$. The resulting solids were cooled and provided 2250 grams of a product which was readily friable and was non-melting at 500° C. and had an $Al_2O_3$ content of 33.3%, $N_2O_5$ content of 20%.

EXAMPLE 5

A charge of 5000 grams of $Al(NO_3)_3 \cdot 9H_2O$ was placed in an autoclave and melted. The agitator was inserted into the melt and the autoclave was closed. The temperature of the charge was raised to 190° C. and the charge was maintained under agitation at a pressure of about 80 p.s.i.g. and a temperature of 190° C.–210° C. for 2 hours when the charge became solid and the agitator stoppd. At this time 62.5% of the $HNO_3$ in the charge had been removed and was recovered as 57% $HNO_3$. Upon release of pressure on the charge, oxides of nitrogen were given off and lost. The distilled acid was dark brown to dark green in color. It was concluded from the run that there is little, if any, advantage in carrying out the denitrification at pressure of 80 p.s.i.g.

While the above describes the preferred embodiments of our invention, it will be understood that departures can be made therefrom within the scope of the specification and claims.

We claim:

1. The process for decomposing aluminum nitrate nonahydrate to alumina and nitric acid which comprises:
   (a) melting the aluminum nitrate nonahydrate;
   (b) heating said molten aluminum nitrate nonahydrate to a temperature above its decomposition temperature but not above about 230° C. under a superatmospheric pressure of at least about 25 p.s.i.g. and sufficient to maintain said decomposition temperature, while removing gaseous nitric acid decomposition products until between about 45% and about 55% of the $HNO_3$ of the aluminum nitrate nonahydrate has been removed;
   (c) reducing said superatmospheric pressure to at least as low as atmospheric pressure whereby additional gaseous nitric acid is released and a molten residue is formed, which upon solidification becomes a friable solid;
   (d) recovering the said nitric acid decomposition product;
   (e) cooling the resulting molten residue to a temperature below the softening point of the residue;
   (f) maintaining the resulting solidified melt at a temperature between about 120° C. and the softening temperature of the solidified melt for a period of at least about ½ hour whereby a non-melting, friable solid is obtained;
   (g) and further heating said non-melting solid at a temperature at least about 220 C. to decompose said non-melting solid into gaseous nitric acid and solid $Al_2O_3$.

2. The process according to claim 1 wherein said non-melting solid is heated at a temperature between about 260° C. and about 375° C. for a period sufficient to substantially completely decompose the non-melting solid into gaseous nitric acid and solid $Al_2O_3$ of at least about 95% $Al_2O_3$ content and separately recovering the nitric acid and $Al_2O_3$ values.

3. The process according to claim 2 wherein the $Al_2O_3$ is subjected to a temperature between about 1000° C. and about 1300° C. for a period sufficient to convert the $Al_2O_3$ substantially completely to alpha alumina.

4. The process for thermally decomposing aluminum nitrate nonahydrate which comprises (1) melting the aluminum nitrate nonahydrate; (2) heating the molten aluminum nitrate nonahydrate under pressures of between about 35 p.s.i.g. and about 50 p.s.i.g. at a temperature between about 170° C. and about 200° C. until between about 45% and about 55% of the $HNO_3$ originally in the aluminum nitrate nonahydrate has been removed from the melt; (3) releasing said melt to atmospheric pressure; (4) cooling the melt to a temperature below its softening point; (5) maintaining the resulting solidified melt at a temperature of about 130° C. for a period of about ½ hour and about 2 hours, whereby a non-melting friable solid is produced; (6) heating said non-melting solid at a temperature between about 300° C. and about 375° C. for a period between about ½ hour and about 4 hours sufficient to remove substantially all the remaining $HNO_3$ and $H_2O$ from the non-melting solid leaving as residual solid an $Al_2O_3$ product of at least about 95% $Al_2O_3$ content.

References Cited

FOREIGN PATENTS

| | | |
|---|---|---|
| 283,117 | 8/1928 | Great Britain. |
| 319,850 | 10/1929 | Great Britain. |
| 367,525 | 2/1932 | Great Britain. |

MILTON WEISSMAN, *Primary Examiner.*

G. T. OZAKI, *Assistant Examiner.*